No. 866,229. PATENTED SEPT. 17, 1907.
G. SCHUBERT.
SELF FEEDING AND POWER PULL BACK HAY PRESS.
APPLICATION FILED MAY 26, 1906.
3 SHEETS—SHEET 1.
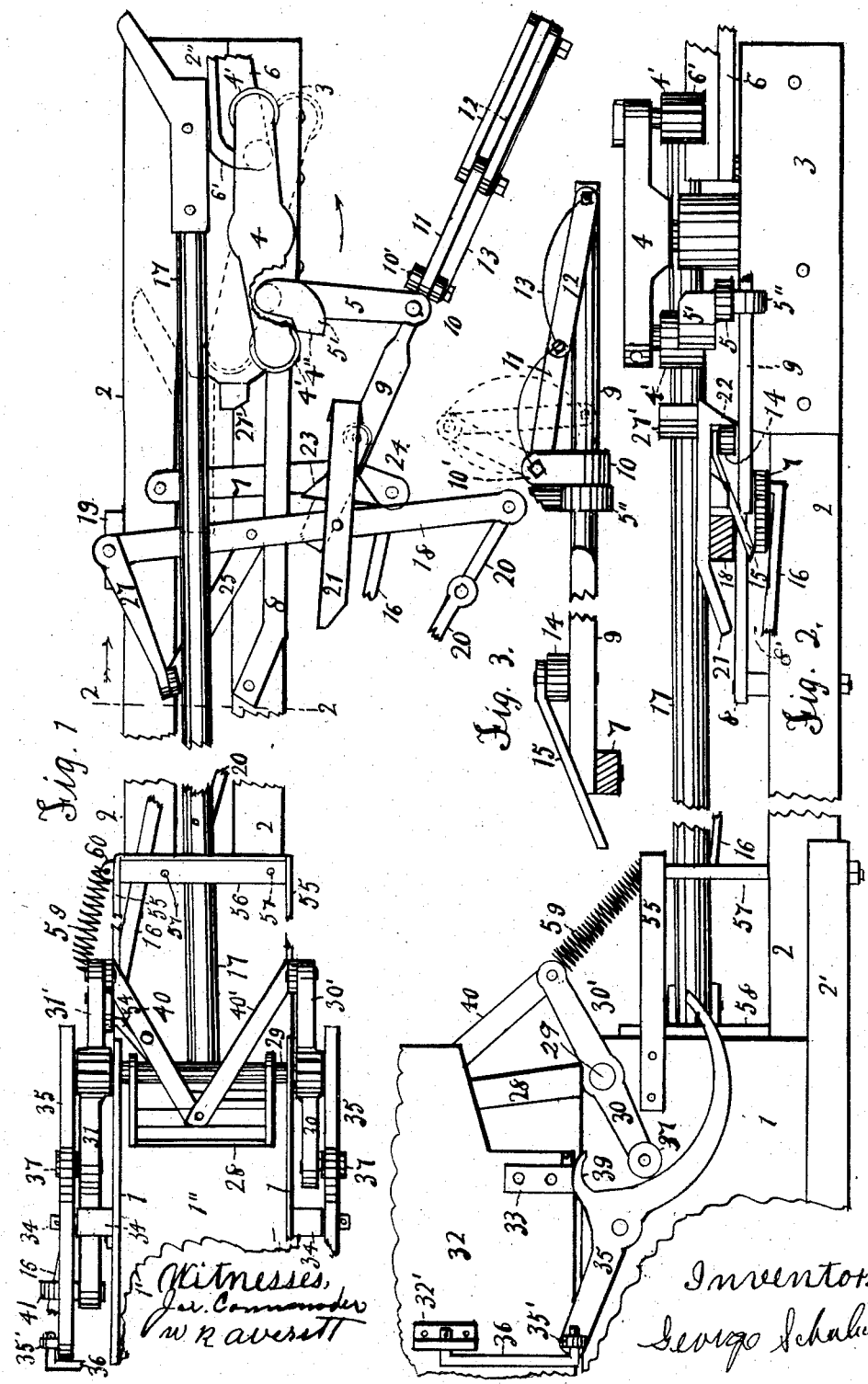

No. 866,229. PATENTED SEPT. 17, 1907.
G. SCHUBERT.
SELF FEEDING AND POWER PULL BACK HAY PRESS.
APPLICATION FILED MAY 26, 1906.
3 SHEETS—SHEET 2.
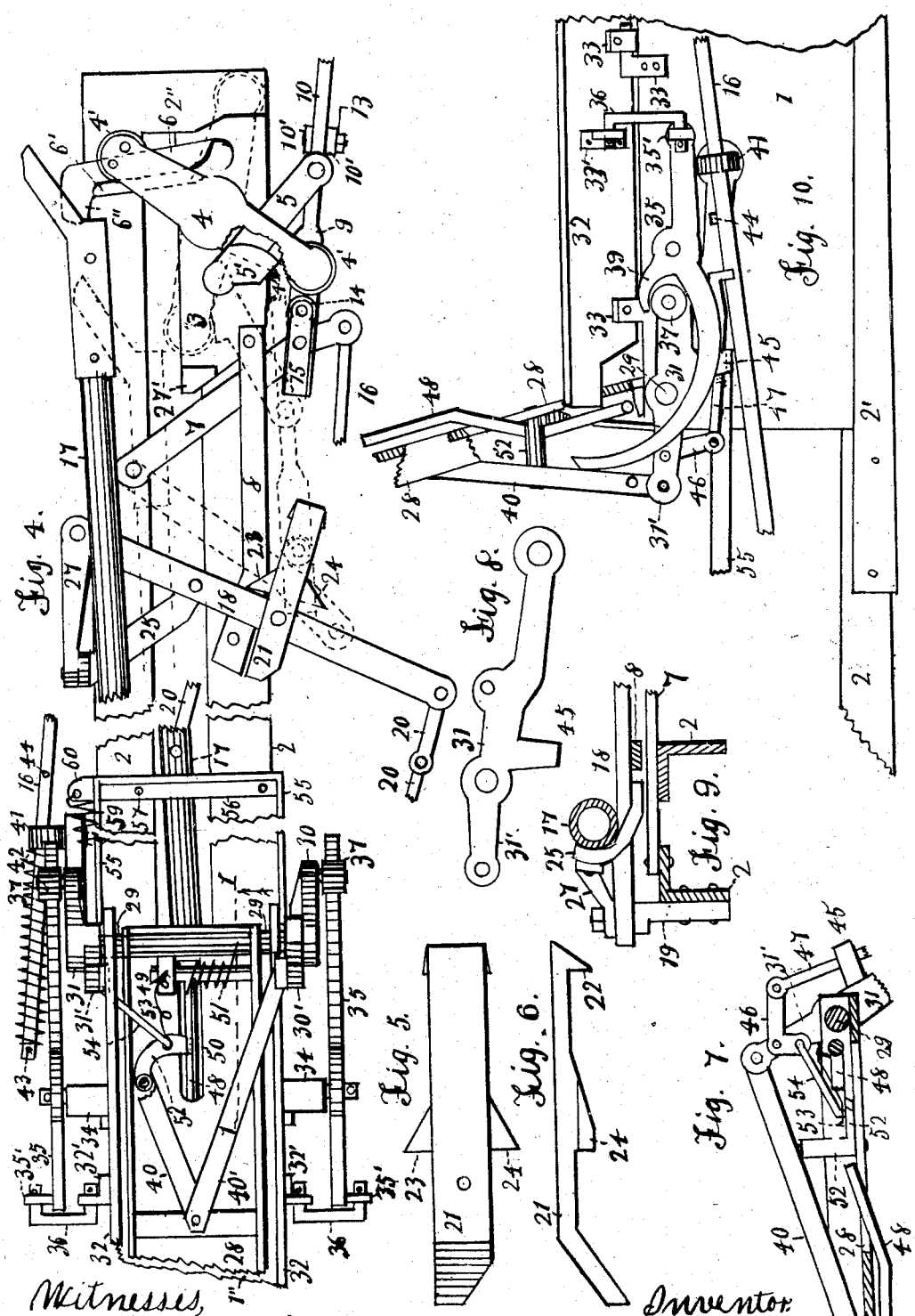
Witnesses,
Joe Cammarinda
N. N. Avritt
Inventor:
George Schubert No. 866,229. PATENTED SEPT. 17, 1907.
G. SCHUBERT.
SELF FEEDING AND POWER PULL BACK HAY PRESS.
APPLICATION FILED MAY 26, 1906.
3 SHEETS—SHEET 3.
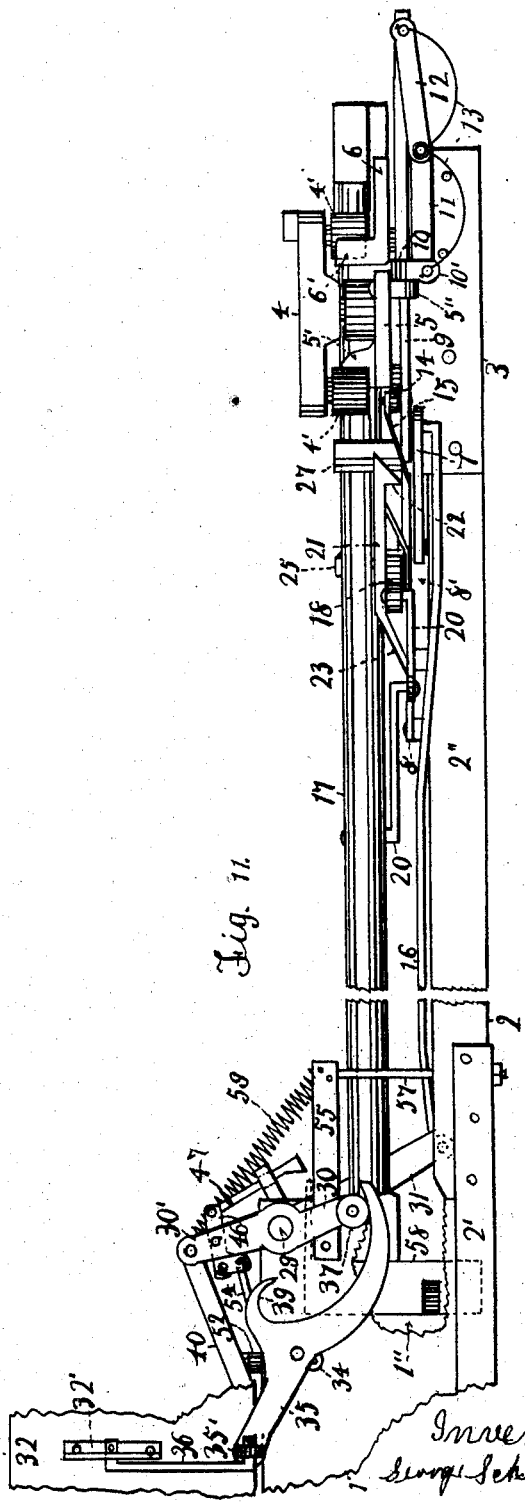

UNITED STATES PATENT OFFICE.

GEORGE SCHUBERT, OF FORT WORTH, TEXAS.

SELF-FEEDING AND POWER PULL-BACK HAY-PRESS.

No. 866,229.  Specification of Letters Patent.  Patented Sept. 17, 1907.

Application filed May 26, 1906. Serial No. 318,870.

*To all whom it may concern:*

Be it known that I, GEORGE SCHUBERT, a citizen of the United States, residing at Fort Worth, in the county of Tarrant, and State of Texas, have invented a new and useful Self-Feeding and Power Pull-Back Hay-Press, of which the following is a specification.

My present invention refers to a self-feeding and power pull back hay press: and refers to hay presses having a cross head pivoted on near the free end of the extension beam with depending rollers on said cross head, to engage with cams formed on arms pivoted within the field of the rollers. And my invention consists: in pivoting levers or bars on the extension beam, and operating such bars by one of such arms simultaneously and separately; to pull the plunger back, and to also operate the self feeder. And also simplifying such self feeder.

In the drawings; Figure 1 is a top plan view of the extension beam and my improved mechanism, and a portion of the hopper and self feeder. Fig. 2 is a side view of said mechanism. Fig. 3 is an edge or side view of a bar with a roller and guard thereon. Fig. 4 is a view similar to Fig. 1, showing the mechanism in different position. Fig. 5 and 6 are plan and edge views of a catch to engage and disengage with a roller. Fig. 7 is a longitudinal section view of the controlling wing of the hopper, taken on line 1—1, of Fig. 4, looking as indicated by arrow, showing a plan view of the advance arm and its mechanism. Fig. 8 is a detail plan view of a crank arm used on the shaft of the controlling wing. Fig. 9 is a cross section on line 2—2, of Fig. 1, looking in direction of arrow, showing the location of the bars on the extension beam. Fig. 10 is a side view of the press, on a slightly reduced scale, and with the nonimportant parts of the body of the press and side wing of the hopper principle broken away to show parts beyond in full lines, and to economize space, and Fig. 11 is an opposite side view of the hopper, with part of the operating wing partly broken away, to show parts beyond in full lines.

Referring to Figs. 1 and 2; 1, 1 represents the side plates, and 1′ the bottom plate, all secured in position by the corner bars 2′ 2′, forming the bale chamber, 1″.

2, 2 represents the angle bars forming the extension beam, 2″ united at their front end; (the power end of the press is considered the front end) and with their inner ends connected to the projecting ends of the corner bars 2′ 2′, all arranged as in common use.

3 represents the usual casting on the front end of the extension beam, provided with the usual perforations to receive the boss or pivot of the cross head 4, and arms 5 and 6. The arm 6 is pivoted on the outer end of the casting 3, and within the field of the rollers 4′ 4′, and provided with a cam 6′ extending upward into the path of the rollers 4′ 4′, and provided with a nose, 6″ on its free end, to engage the end of the plunger bar 17. The arm 5 is pivoted on near the inner end of said casting and within the field of the rollers 4′ 4′, and provided with a cam 5′ projecting within the field of said rollers 4′ 4′, and provided with a straight face, 4″ of a specified length, later on noted.

7 represents a bar, (see Figs. 4 and 9,) pivoted on the far angle of the extension beam, and shiftably in a slot 8′ formed by a bar 8, blocked up to clear the bar 7, and secured on said extension beam in such position.

9 is a bar or rod, (see, Fig. 3,) pivoted with its flattened end on the projecting bar 7, and with its opposite end rounded and supported shiftable in an eyebolt 5″, carried by the free end of the arm 5.

10 represents a collar adjustable on the rod 9, on the front side of the eye bolt 5″.

11 is a bar or link, pivoted on lugs 10′ of the collar, 10, and with its opposite end pivoted to two links, 12, 12 in turn pivoted to the end of the rod 9.

13 is a spring coiled on the center pivot of the links 11 and 12, 12, and with its ends secured to the end pivots of said links, in a manner to hold said center pivot against the rod 9.

14 is a roller on the rod 9, a short distance from its rear or pivoted end, with a brace 15 extending from the upper end of the roller 14 to and beyond the pivot of said rod.

16 is a rod pivoted on the bar 7, and extending through below the plunger bar 17 to the opposite side and body part of the press, and through an eye bolt 41, later on noted.

18 represents a second bar, pivoted on a bracket 19, rigid on the far side of the extension beam, and resting on the bar 8 and projecting beyond said bar 8, and connected by one or more links or rods 20, 20, to the plunger bar 17.

21 represents a catch, (see Figs. 5 and 6,) pivoted on the bar 18, on the outer side of the bar 8, with the hook 22 in position to engage with the roller 14; and having shoulders 23 and 24, depressed, to engage with the front side or edge of the bar 18, and with its rear end turned down to engage with the edge of the bar 8. The rear end of the bar 8 is turned in, and the shoulder 23 of proper length to bring the hook 22 directly over the roller 14, as indicated in Fig. 4, when both bars 7 and 18 are shifted back.

25 is a bar rigid on the bar 18, a short distance from latter's pivot, and projecting rearward and outward, (see Figs. 1 and 8,) and with its end curved upward to engage the plunger bar 17, and braced in position by the brace 27 extending from said curved end to the pivot of the bar 18.

27′ is a side stop for the plunger bar 17.

Referring now to the self feeding part of the press. 28 represents the end or controlling wing o per, (see Figs. 1, 2, and 10,) said wing is rigid on the shaft 29, which is pivoted in perforations formed in the front and upper corners of the side plates 1, 1. 30 and 31 are crank arms rigid on the projecting ends of said shaft.

29, 32, 32 are side wings, hinged to the plates 1, 1, by any common hinges 33, 33.

34, 34, are brackets rigid on the side plates 1, 1, located a short distance back of the shaft 29, (see Figs. 1, 4, and 11.) 35, 35, are levers centrally pivoted on said brackets 34, 34, and connected with their rear ends by eye bolts 35', 35' and links 36, 36 to brackets 32', 32' rigid on the wings 32, 32, said levers having their free ends curved to coincide with the path of rollers 37, 37, on the crank arms 30 and 31. 39, 39 are spurs above the inner end of said curves, on said levers.

30' and 31' are spurs on the crank arms 30 and 31 projecting forward and upward, (see Figs. 2 and 8,) and connected to the end wing 28 by bars 40 and 40'; and the roller 37, on the opposite end of said crank arm 30 in contact with the lever 35. The crank arm 31 has a similar roller 37 in contact with the lever 35 on the opposite side of the press; and projecting with its body beyond the said roller 37 and bracket 34, and set down, (see Fig. 8,) to clear said bracket 34; and having pivoted in its end an eye bolt 41, to support shiftable the rear end of the rod 16. 42 is a spring on the rear end of said rod 16 resting with one end against a pin 43 near the end of said rod, and with its opposite end against the eye bolt 41.

45 is a downwardly projecting spur on the crank arm 31, a short distance from the shaft 29.

46 is a bell-crank lever, (see Figs. 7 and 10,) pivoted with its heel on near the end of the spur 31' and projecting with its longer end downward and having pivoted thereto a bar 47, extending through a perforation of the spur 45, and with its end in position to be engaged by a pin 44 in the rod 16, located on the front side of the eye bolt 41.

48 represents an advance arm or tongue, (see Figs. 7 and 10,) pivoted on the wing 28 near the shaft 29, finding its bearings in the flange of the wing 28 and in a block 49, and projecting with its body through a slot formed in the wing 28, and pressed downward by a spring 51 on the heel of said tongue 48, and resting with its opposite end on the shaft 29.

52 represents a dog pivoted between the wing 28 and the brace 40, and with its body in position to engage the tongue 48, and pressed in to such engagement by a spring 53 secured to near the end of said dog 52 and to the bearing 49. 54 is a bar connecting said dog 52 to the bell crank lever 46.

55 are bridle bars secured to the plates 1, 1 and projecting forward, and with their ends united by a cross bar 56, extending across above the plunger bar, 17 a short distance from the front end of the plates 1, 1, and braced by stay bolts 57, extending from said cross bar 56 to the extension beam.

58 represents the usual plunger rigid on the plunger bar 17.

59 represents a spiral spring anchored with one end on the spur 31' and with its other end on a bracket 60 rigid on the cross bar 56.

In operating the press: the cross head is rotated in the direction of arrow in Fig. 1; and as one of the rollers 4' leaves the plunger bar 17 it moves against the cam 5' and moves the arm 5 in the direction of arrow, from the position seen in dotted lines in Fig. 4, and thus move the rod 16 and the bar 7 in the same direction, and the hook 22 extending over the roller 14 will in turn be moved in the same direction, and in turn move the bar 18. By the time the arm 5 and its connecting mechanism is shifted to the position as seen in Fig. 1, the plunger will have been drawn out or back, and the shoulder 24 engaging the side of the bar 18 will cause the pivoted catch 21 to become rigid on the bar 18, and cause the hook 22 to shift off the roller 14; by reason of the pivots of the bars 7 and 18 being in different fields, and thus release said bar 18, which will now begin to be drawn back as the plunger moves in. As the bar 18 is moved from the position seen in Fig. 4 to the position seen in Fig. 1, the far and curved end of the bar 25 will move against the plunger bar 17 and crowd or shift said plunger bar 17 over against the arm 6, or within easy reach of said arm 6. And the bar 7 continuing on its forward movement until in the position seen in full lines in Fig. 4 where it will be retained until the roller 4' shall have passed beyond the face 4'' of the cam 5' after this the spring 59 will open the hopper, (as later on noted,) and thus draw said arm 5 and its mechanism back to the position seen in dotted lines in Fig. 4; again bringing the roller 14 beneath the hook or latch 21. As the arm 5 moves forward as described, and the rod 16 being pivoted in the free end of the bar 7, said rod also moves forward, and first compressing the spring 42; by reason of the pressure of the rod 16 on the eye bolt 41 being nearly on line with the pivot of the shaft 29, and the resistance of the spring 59 and the weight of the wings 32, 32. As the spring is thus being compressed, the rod 16 moves forward, the pin 44 will move against the end of the bar 47 shifting it in said direction, and by the means of the bar 54 and bell crank lever 46 will withdraw the dog 52 from beneath the tongue 48 and thus allow said tongue 48 to move down on the hay. The crank arms 31 and 31' now begin to move forward, moving the levers 35, 35 from the position seen in Fig. 10 to the position seen in Fig. 2, thus closing the side wings 32, 32 of the hopper, and the controlling wing 28 will also have moved from the position seen in Fig. 10 to the position seen in Fig. 2, by this time the arm 5 and its connected parts will have moved to the position seen in Fig. 1. And the plunger now having been withdrawn, and the rod 16 continuing on its forward movement far enough to close the controlling wing 28 down to the level of the upper edge of the plunger and retained there until the roller 4' has traveled past the straight face 4'' after the wing 28 will open out as previously described; and the rollers 37, 37 coming in contact with the spurs 39, 39 will open out the side wings 32, 32. After the controlling wing 28 has been depressed or closed down, and the plunger moving in the bale chamber 1'', will move against the downward projecting portion of the tongue 48, and pressing said tongue back or up against said wing 28 and admit of the dog 52 to engage said tongue 48 and lock it to said wing 28 again. The rear end of the guard 15 extends far enough down to always shift beneath the clutch 21 and the bar 18. If there is an excessive charge on the hopper such as the feeder cannot handle, or the plunger is wedged extra solid, then more pressure on the collar 15 will cause the spring 13 to yield and allow the central pivot of the links 11 and 12 to open out and allow the collar 10 to shift on the rod 9 and the links assume the position seen in Fig. 3, allowing the rod 9 to shift in the eye bolt 5″ and the team to pass on without straining the said parts. After the pressure on the collar 10 has been released the spring 13 will shift the links 11 and 12 to their original position.

Having thus described my invention, what I claim and desire to secure by Letters Patent is—

1. In a self feeding hay press, the combination, with an extension beam, a cross head pivoted thereon, an arm having a cam and pivoted within the field of the cross head, a bar pivoted on the extension beam, a rod connecting said bar to the arm, a crank arm of the self feeder, a rod connecting said crank arm to said bar, for the purpose described.

2. In a self feeding hay press, the combination, with an extension beam, a cross head pivoted thereon, an arm, a cam thereon having a face of specified length, and pivoted within the field of the cross head, a bar pivoted on the extension beam, a rod connecting said bar to the arm, a crank arm of the self feeder, a rod connecting said crank arm to said bar, for the purpose described.

3. In a self feeding hay press, the combination, with an extension beam, a cross head pivoted thereon, an arm, a cam thereon and pivoted within the field of the cross head, an eye bolt carried by said arm, a rod supported adjustable in said eye bolt, a collar on said rod, links pivoted to said collar and to said rod, a spring to retain said links, a bar pivoted to the extension beam and to said rod, a crank arm of the self feeder, a rod connecting said crank arm to said bar, for the purpose described.

4. In a self feeding hay press, the combination, with an extension beam, a cross head pivoted thereon, an arm, a cam thereon and pivoted within the field of the cross head, a bar pivoted to the extension beam, a rod connecting said bar to said arm, a lug or roller on said rod, a second bar pivoted on the extension beam and having its pivot back of the pivot of the first said pivoted bar, a catch pivoted on the second pivoted bar, a shoulder on said catch to engage with its supporting bar, a plunger bar, a rod connecting said second bar to the plunger bar, for the purpose described.

5. In a self feeding hay press, the combination, with an extension beam, a cross head pivoted thereon, an arm a cam thereon, and pivoted within the field of the cross head, a bar pivoted to the extension beam, a rod connecting said bar to the arm, a lug or roller on said rod, a second bar pivoted to the extension beam, a catch pivoted on said second bar and projecting with its rear end beyond said bar, a bar rigid on the extension beam and having its end turned in, a shoulder on said catch, a plunger bar, a rod connecting said second bar to said plunger bar, for the purpose described.

6. In a self feeding hay press, the combination, with an extension beam, a cross head pivoted thereon, an arm a cam thereon, and pivoted within the field of the cross head, a bar pivoted to the extension beam, a rod connecting said bar to said arm, a lug or roller on said rod, a guard extending over said roller, a second bar pivoted to the extension beam, a catch on said second bar and projecting with its rear end beyond said bar, a bar rigid on the extension beam and having its rear end turned inward, a shoulder on said catch, a plunger bar, a rod connecting said second bar to the plunger bar, for the purpose described.

7. In a self feeding hay press, the combination, with an extension beam, a cross head pivoted thereon, an arm a cam thereon, and pivoted within the field of the cross head, a bar pivoted to the extension beam, a rod connecting said bar to said arm, a roller on said rod, a second bar pivoted to the extension beam, a catch on said second bar, shoulders on said catch, a bar rigid on the extension beam having its body raised to form a slot for the first said pivoted bar and to form a support for the second said pivoted bar, a plunger bar, a rod connecting said second pivoted bar to the plunger bar, for the purpose described.

8. In a self feeding hay press, the combination, with an extension beam, a cross head pivoted thereon, an arm a cam thereon, and pivoted within the field of the cross head, a bar pivoted to the extension beam, a rod connecting said bar to said arm, a roller on said rod, a second bar pivoted to the extension beam, a catch on said second bar shoulders on said catch, a plunger bar, a rod connecting said second pivoted bar to the plunger bar, a bar or bracket rigid on said second pivoted bar to engage with said plunger bar, for the purpose described.

9. In a self feeding hay press, the combination, with an extension beam, a cross head pivoted thereon, an arm a cam thereon, and pivoted within the field of the cross head, a bar pivoted to the extension beam, a rod connecting said bar to said arm, a roller on said rod, a second bar pivoted to the extension beam, a catch on said second bar, shoulders on said catch, a plunger bar, a rod connecting said second pivoted bar to the plunger bar, a rod connecting the first said pivoted bar to an arm of the self feeder, for the purpose described.

10. In a self feeding hay press, the combination, with a hopper formed of wings, a controlling wing for said hopper, a shaft for said controlling wing, a crank arm on said shaft, a bell-crank lever pivoted on a spur of said crank arm, a rod supported by said crank arm, a lug or pin on said rod, a bar pivoted on the bell-crank lever and engaged by said pin, a dog pivoted on the controlling wing and connected to said bell-crank lever, a tongue or advance arm pivoted on said controlling wing, and means to operate said rod, for the purpose described.

11. In a self feeding hay press, the combination, with a hopper formed of wings, a controlling wing for said hopper, a shaft of said controlling wing, an arm or crank arm having a spur and rigid on said shaft, a bell-crank lever pivoted on said spur, a second spur on said crank arm, a bar supported adjustably by said second spur and pivoted to said bell-crank lever, a rod supported by the crank arm, a lug or pin on said rod, and means to operate said rod; a tongue or advance arm pivoted on the controlling wing, a dog to engage said tongue and connected to the bell-crank lever, and means to operate said tongue, for the purpose described.

12. In a self feeding hay press, the combination, with a hopper formed of wings, a controlling wing for said hopper, a shaft for said controlling wing, a tongue pivoted on said controlling wing, a spring to press said tongue inward, a dog pivoted on said controlling wing, and means to operate said dog, for the purpose described.

GEORGE SCHUBERT.

Witnesses:
 JAS. COMMANDER,
 W. R. AVERITT.